(No Model.)

R. I. SKILES.
SPRING STARTER FOR VEHICLES, &c.

No. 395,297. Patented Dec. 25, 1888.

Witnesses.
A. Ruppert.
G. B. Towles.

Inventor.
Robert I. Skiles
Per
Thomas P. Simpson
Atty

UNITED STATES PATENT OFFICE.

ROBERT IRONS SKILES, OF ROCK ISLAND, ILLINOIS, ASSIGNOR TO THOMAS J. MEDILL, JR., OF SAME PLACE, AND WILL G. WHITEHEAD, OF ROCK ISLAND COUNTY, ILLINOIS.

SPRING-STARTER FOR VEHICLES, &c.

SPECIFICATION forming part of Letters Patent No. 395,297, dated December 25, 1888.

Application filed July 24, 1888. Serial No. 280,888. (No model.)

*To all whom it may concern:*

Be it known that I, ROBERT IRONS SKILES, a citizen of the United States, residing at Rock Island, in the county of Rock Island and State of Illinois, have invented certain new and useful Improvements in Spring-Starters for Vehicles, Plows, and Analogous Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates generally to spring-starters for use on vehicles and agricultural implements drawn by horses; and my especial object is to make a starter which shall be simple in construction, easily attached, put together, and taken apart quickly, and withal very durable.

Figure 1:
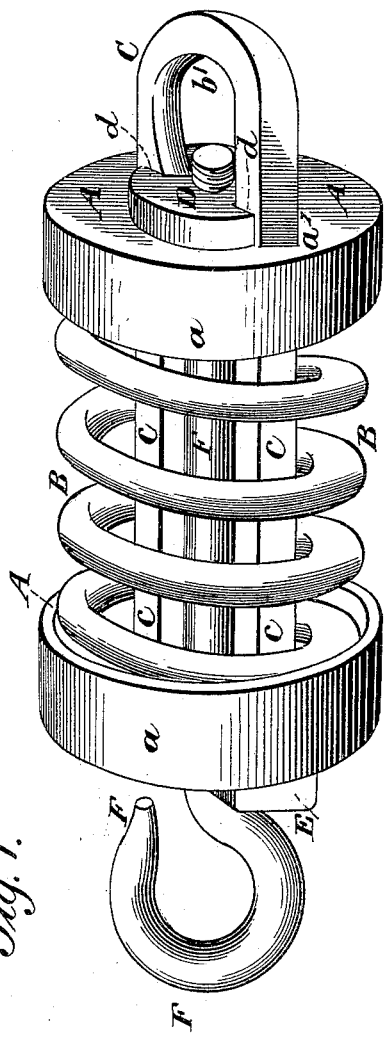
Figure 3:
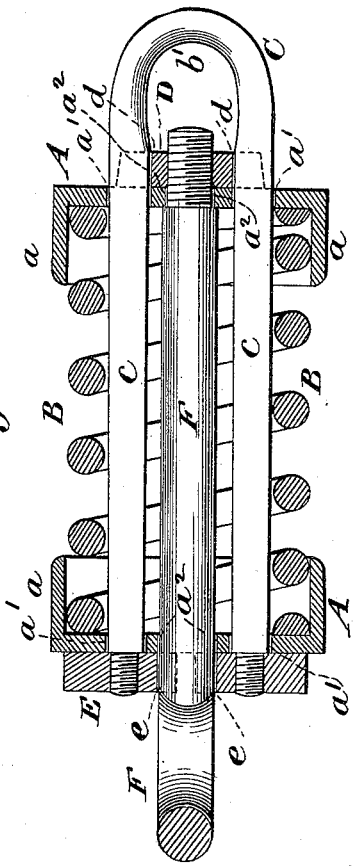
Figure 2:
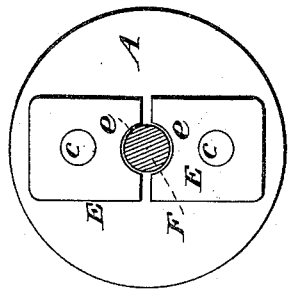

Figure 1 of the drawings is a perspective view of my starter; Fig. 2, an end elevation, and Fig. 3 a median longitudinal section.

In the drawings, A A represent two caps, between which I place my coiled spring B, whose ends are inclosed by the flanges $a$. Between the arms $c\ c$ of the U-bar C, I slide nearly up to the turn $b'$, in which the vehicle or plow clevis is placed, the nut D, which has opposite notches $d\ d$, in which fit the arms $c\ c$, the nut being thus prevented from turning. I then pass the arms $c\ c$ through the cap-holes $a'\ a'$, and on the threaded ends of the arms $c\ c$ screw "home" the nuts E E, when their grooves $e\ e$ will be opposite each other. Through these grooves $e\ e$, I pass the hook-rod F, and also through the central cap-holes, $a^2\ a^2$, screwing it into the nut D. Thus it will be seen that all three of the nuts are effectually locked, so that the parts of the starter cannot become loose, while they may be quickly put together or taken apart.

I am perfectly well aware that a coiled spring has been combined with a draft-rod for the same purpose; but

What I claim as new, and desire to protect by Letters Patent, is—

The combination, with an end-threaded draft-rod and coiled spring, of the two caps A A, end-flanged at $a\ a$, and provided with holes $a'\ a'$, the U-bar C, having end-threaded arms $c\ c$, and the three notched nuts D E E, whereby the parts may be put together, effectually locked in their proper positions, and taken apart, in the manner described.

In testimony whereof I affix my signature in presence of two witnesses.

ROBERT IRONS SKILES.

Witnesses:
   JNO. M. SNAVELY,
   F. E. ANDREWS.